US006887559B1

(12) United States Patent
Darsillo et al.

(10) Patent No.: US 6,887,559 B1
(45) Date of Patent: May 3, 2005

(54) RECORDING MEDIUM

(75) Inventors: Michael S. Darsillo, Clifton Park, NY (US); David J. Fluck, Bel Aire, MD (US); Rudiger Laufhutte, Tuscola, IL (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/670,118

(22) Filed: Sep. 26, 2000

Related U.S. Application Data

(60) Provisional application No. 60/157,462, filed on Oct. 1, 1999.

(51) Int. Cl.[7] .................................................. G11B 5/18

(52) U.S. Cl. ........................ 428/206; 428/323; 428/402

(58) Field of Search ................................ 428/143, 206, 428/694 SL, 694 SG, 323, 402

(56) References Cited

U.S. PATENT DOCUMENTS

| | | | | |
|---|---|---|---|---|
| 4,154,899 | A | 5/1979 | Hershey et al. | |
| 4,186,178 | A | 1/1980 | Oberlander | |
| 4,191,737 | A | 3/1980 | Irvine | |
| 4,360,449 | A | 11/1982 | Oberlander et al. | |
| 4,476,257 | A | * 10/1984 | Ishino et al. | 523/181 |
| 4,522,958 | A | 6/1985 | Das et al. | |
| 4,526,910 | A | 7/1985 | Das et al. | |
| 4,532,289 | A | 7/1985 | Mosser et al. | |
| 4,544,408 | A | 10/1985 | Mosser et al. | |
| 4,569,920 | A | 2/1986 | Smith-Johannsen | |
| 4,746,503 | A | 5/1988 | Barclay et al. | |
| 4,772,660 | A | 9/1988 | Kitamura et al. | |
| 5,041,328 | A | 8/1991 | Akiya et al. | |
| 5,081,470 | A | 1/1992 | Kurabayashi et al. | |
| 5,124,201 | A | 6/1992 | Kurabayashi et al. | |
| 5,171,626 | A | * 12/1992 | Nagamine et al. | 428/212 |
| 5,198,306 | A | * 3/1993 | Kruse | 428/481 |
| 5,264,275 | A | 11/1993 | Misuda et al. | |
| 5,266,383 | A | 11/1993 | Sakaki et al. | |
| 5,271,958 | A | 12/1993 | Szczepanski et al. | |
| 5,320,897 | A | 6/1994 | Kondo et al. | |
| 5,397,619 | A | 3/1995 | Kuroyama et al. | |
| 5,399,407 | A | 3/1995 | Hatanaka et al. | 428/64 |
| 5,472,757 | A | 12/1995 | Ogawa et al. | |

(Continued)

FOREIGN PATENT DOCUMENTS

| | | | | |
|---|---|---|---|---|
| EP | 803374 | A2 * | 10/1997 | |
| EP | 0 878 322 | A2 | 11/1998 | B41M/5/00 |
| EP | 1 048 479 | A2 | 11/2000 | B41M/5/00 |
| JP | 07-060832 | | 3/1995 | |

OTHER PUBLICATIONS

Cover Sheets of "Handbook of Fillers"2nd Ed. (Ed. George Wypych), Toronto–New York, 2000.*

Handbook of Filler—A Definitive User's Guide and Databook (2nd Ed), p. 131.*

"*Aqueous AEROSIL® and Aluminium Oxide Dispersions*"in *Technical Bulletin Pigments*, Degussa, No. 33, pp. 1–17 (Dec. 1982).

"*Highly Dispersed Metallic Oxides Produced by the AEROSIL® Process*" in *Technical Bulletin Pigments*, Degussa, No. 56, pp. 1–38 (Mar. 1993).

International Search Report for PCT/US00/26464 mailed Dec. 20, 2000.

JP11246218 to Asahi Glass Co. Ltd. entitled, "Alumina Sol, Production of Alumina Sol and Recording Sheet"—Absract only (from Patent Abstracts of Japan).

Written Opinion for International Patent Application No. PCT/US00/26464, mailed Aug. 31, 2001.

JP07–060832 A to Toray Ind, Inc.—Abstract only (from Derwent database, Week 199518, AN 1995–136461).

*Primary Examiner*—Kevin M. Bernatz

(57) ABSTRACT

A recording medium comprising a substrate having a glossy coating thereon, wherein the glossy coating comprises a binder and alumina particles that are aggregates of primary particles.

22 Claims, 4 Drawing Sheets

U.S. PATENT DOCUMENTS

| | | | | | |
|---|---|---|---|---|---|
| 5,472,773 | A | | 12/1995 | Misuda et al. | |
| 5,523,149 | A | | 6/1996 | Kijimuta et al. | |
| 5,527,423 | A | | 6/1996 | Neville et al. | |
| 5,561,454 | A | * | 10/1996 | Kurabayashi et al. | 347/105 |
| 5,567,353 | A | | 10/1996 | Bogan, Jr. | |
| 5,576,088 | A | | 11/1996 | Ogawa et al. | |
| 5,609,964 | A | | 3/1997 | Ogawa et al. | |
| 5,616,398 | A | * | 4/1997 | Kurose et al. | 428/141 |
| 5,624,482 | A | | 4/1997 | Kijimuta et al. | |
| 5,635,291 | A | | 6/1997 | Yoshino et al. | |
| 5,635,297 | A | | 6/1997 | Ogawa et al. | |
| 5,637,196 | A | | 6/1997 | Ogawa et al. | |
| 5,647,935 | A | | 7/1997 | Hoshino et al. | |
| 5,677,034 | A | * | 10/1997 | Okazaki et al. | 428/1.31 |
| 5,679,451 | A | | 10/1997 | Kondo et al. | |
| 5,707,716 | A | | 1/1998 | Yoshino et al. | |
| 5,738,932 | A | | 4/1998 | Kondo et al. | |
| 5,741,584 | A | | 4/1998 | Imabeppu et al. | |
| 5,750,200 | A | | 5/1998 | Ogawa et al. | |
| 5,753,360 | A | | 5/1998 | Jones et al. | |
| 5,800,916 | A | | 9/1998 | Yoshino et al. | |
| 5,804,320 | A | | 9/1998 | Tomioka et al. | |
| 5,846,647 | A | | 12/1998 | Yoshino et al. | |
| 5,851,654 | A | | 12/1998 | Yoshino et al. | |
| 5,856,001 | A | * | 1/1999 | Okumura et al. | 428/331 |
| 5,869,177 | A | | 2/1999 | Yoshino et al. | |
| 5,907,342 | A | | 5/1999 | Sakaki et al. | |
| 5,908,723 | A | | 6/1999 | Malhorta et al. | |
| 5,910,359 | A | * | 6/1999 | Kobayashi et al. | 428/327 |
| 5,911,855 | A | * | 6/1999 | Dransmann et al. | 162/135 |
| 5,912,071 | A | | 6/1999 | Takeshita et al. | |
| 5,928,127 | A | | 7/1999 | Tanuma | |
| 5,965,244 | A | * | 10/1999 | Tang et al. | 428/32.36 |
| 6,025,068 | A | * | 2/2000 | Pekala | 428/315.5 |
| 6,096,157 | A | * | 8/2000 | Imabeppu et al. | 156/285 |
| 6,114,022 | A | * | 9/2000 | Warner et al. | 428/315.5 |
| 6,124,031 | A | * | 9/2000 | Yoshida et al. | 428/327 |
| 6,136,440 | A | * | 10/2000 | Ito et al. | 428/411.1 |
| 6,187,419 | B1 | * | 2/2001 | Kijimuta et al. | 428/212 |
| 6,187,430 | B1 | * | 2/2001 | Mukoyoshi et al. | 428/331 |
| 6,238,784 | B1 | * | 5/2001 | Mochizuki et al. | 428/321.1 |
| 6,338,891 | B1 | * | 1/2002 | Kawasaki et al. | 428/195 |
| 6,440,552 | B1 | * | 8/2002 | Kajihara et al. | 428/323 |
| 6,468,395 | B1 | * | 10/2002 | Chao et al. | 162/136 |
| 2002/0164464 | A1 | * | 11/2002 | Monie | 428/195 |

* cited by examiner

RECORDING MEDIUM

CROSS-REFERENCE TO RELATED PATENT APPLICATIONS

This patent application claims priority to provisional U.S. patent application Ser. No. 60/157,462 filed on Oct. 1, 1999.

TECHNICAL FIELD OF THE INVENTION

The present invention relates to recording media comprising alumina particles in the coating thereof, compositions comprising such particles, and production methods therefor.

BACKGROUND OF THE INVENTION

A surface coating is sometimes applied to a recording medium in order to improve its printing properties. For example, the coating can improve the appearance, ink absorption, and/or image smear resistance of the medium.

Surface coatings can be classified into two general categories—glossy coatings and non-glossy (matte or dull) coatings. Glossy coatings are highly desirable, as they are very smooth, and can impart a superior feel and a photograph-like quality to a recorded image. However, it remains a challenge to provide a glossy medium that imparts superior printing properties to the medium (e.g., good ink absorption, good dye-fixing ability, good waterfastness, and/or good resistance to image smear), in addition to superior smoothness and gloss.

Gloss and dye immobilization (i.e., dye-fixing) can sometimes be achieved by incorporating different types of polymeric resins into a coating. For example, a gelatin, a polyvinyl alcohol, a polyolefin resin, polyester resin, polyamide resin, and/or polycarbonate resin can be used to produce glossiness, while a cationic polymer (e.g., polyvinylpyrrolidone) can be used to promote the surface immobilization of an anionic dye. However, inks applied to resin-coated recording media dry relatively slowly, and often have an undesirable tendency to smear and rub off. While some pigments such as certain treated kaolin clays or treated calcium carbonates can immobilize dyes, the overall absorptivity and rate of absorption are often compromised.

Using a metal oxide pigment such as silica or alumina can be advantageous in that they have good absorptivity and also can produce an excellent coating. Alumina is particularly advantageous in that its particles naturally have a cationic surface (i.e., a positive zeta potential). Since the vast majority of ink dyes are anionic in nature, the cationic surface of alumina imparts superior dye immobilizing properties to coatings derived therefrom. Moreover, alumina also imparts good ink absorption, good waterfastness, and good image smear resistance, in addition to superior gloss, smoothness, and brightness, to the coating.

Despite its advantages, the use of alumina presents significant challenges in the recording medium coating industry in that alumina is very difficult to process. Unlike silica, which is typically amorphous, alumina is crystalline, and can exist in various crystalline phases, for example, alpha, or the transitional phases, for example, gamma, delta, and theta phases. In addition, long drying times are typically required in recording medium coating which utilize low solids alumina dispersions, making the overall coating process costly and inefficient. Moreover, some forms of alumina require a relatively high binder ration (about 3:1 pigment to binder ratio). The high binder demand of alumina restricts the ratio of alumina particles (relative to binder) that can be achieved in the coating, sacrificing desirable properties that could otherwise be imparted to the coating by the alumina particles (e.g., drying time, dye immobilization, waterfastness, image quality, and the like). As such, the overall quality of the recording medium can be limited.

Poor colloidal stability of alumina also seriously limits the solids content that can be attained in coating compositions used to make the recording media, thereby placing an upper limit on coater productivity (throughput), as drier demand can be excessive in order to adequately dry the coating on the substrate. In a commercial setting, such coating compositions are produced from an initial alumina dispersion. The initial dispersion is often manufactured in a separate facility and shipped to the end user. Typically, the end user processes the initial dispersion into a coating composition, which is normally applied to a substrate shortly after its production.

As dispersions with higher alumina solids content have a greater tendency to gel or separate (i.e., the solid settles out of the dispersion), low solids initial dispersion are used. As such, the overall quality of recording media is limited by the low alumina solids content (e.g., in terms of porosity, dye immobilization, image quality, or the like).

Accordingly there remains a need for an improved recording medium comprising alumina particles, desirably having a low binder demand and high porosity, as well as an alumina-based coating composition and a method of producing such a composition and recording medium. The present invention provides such a recording medium, coating composition, and methods of making them. These and other advantages of the present invention, as well as additional inventive features, will be apparent from the description of the invention provided herein.

BRIEF SUMMARY OF THE INVENTION

The present invention provides a recording medium comprising a substrate having a glossy coating thereon, wherein the glossy coating comprises a binder and alumina particles that are aggregates of primary particles. The coating of the recording medium of the present invention comprises alumina particles that are aggregates of primary particles, with pyrogenic or fumed alumina being preferred.

The present invention further provides a coating composition comprising alumina particles and a binder, wherein the alumina particles are aggregates of primary particles and the solids content of the alumina in the coating composition is at least about 20 wt. %.

The present invention also provides a method of preparing a coating composition. The inventive method of preparing a coating composition comprises providing a colloidally stable dispersion comprising water and alumina particles, wherein the alumina particles are aggregates of primary particles and the solids content of the alumina particles in the dispersion is at least about 30 wt. %; adding a binder to and, optionally, diluting the colloidally stable dispersion, until a desired pigment to binder ratio and overall solids content are obtained; and optionally adjusting the pH with a suitable acid or base.

The present invention additionally provides a method of preparing a recording medium. The inventive method of preparing a recording medium comprises providing a substrate; coating the substrate with the coating composition of the present invention to produce a substrate coated with a coating; optionally calendering the coated substrate; and drying the coated substrate.

The coating composition of the present invention dries quickly when applied to a substrate, to form a non-tacky glossy coating.

DESCRIPTION OF THE PREFERRED EMBODIMENTS

Figure 1:
FIG. 1 illustrates the electron micrograph of fumed alumina aggregate particles used in the recording medium of the present invention.

The present invention provides a recording medium comprising a substrate having a glossy coating thereon, wherein the glossy coating comprises a binder and alumina particles that are aggregate of primary particles.

The inventive recording medium comprises a substrate, which can be either transparent or opaque, and which can be made of any suitable material. Examples of such materials include, but are not limited to, films or sheets of polymer resins (e.g., poly(ethylene terephthalate)), diacetate resins, triacetate resins, acrylic resins, polycarbonate resins, polyvinyl chloride resins, polyimide resins, cellophane and celluloid, glass sheets, metal sheets, plastic sheets, paper (e.g., cellulose paper, synthetic paper), coated paper (e.g., resin-coated paper), pigment-containing opaque films, and foamed films. Polyester sheets and cellulose paper are preferred, with poly(ethylene terephthalate) sheets being a preferred polyester.

The substrate used in the recording medium of the present invention has a glossy coating thereon, which can be of any suitable thickness. In particular, the coating is preferably from about 1 μm to about 50 μm in thickness, more preferably from about 5 μm to about 40 μm in thickness, and most preferably from about 10 μm to about 30 μm in thickness. The recording medium of the present invention provides excellent gloss and also has good ink absorption, dye immobilization, a high rate of liquid absorption, and overall liquid absorption capacity. Moreover, the recording medium of the present invention provides excellent image quality, particularly when used in ink jet printing applications.

In certain embodiments of the present invention the inventive recording medium comprises a substrate having more than one layer of coating, which can be the same or different. However, at least one of the coating layers comprises alumina particles with properties as described herein. For example, the recording medium of the present invention can comprise a substrate coated with one or more ink-receptive layers (e.g., comprising anionic silica) and/or one or more resinous layers (e.g., a glossy, laminated surface layer). Even when the recording medium of the present invention comprises such additional layers of coating, it has been found that the above-described glossy coating comprising the alumina particles described herein provides sufficient ink absorption, dye immobilization, and gloss for the vast majority of printing applications.

The coating of the recording medium of the present invention comprises alumina particles that are aggregates of primary particles, with pyrogenic or fumed alumina being preferred. Particles of pyrogenic alumina are aggregates of smaller, primary particles. Although the primary particles are not porous, the aggregates contain a significant void volume, and are capable of rapid liquid absorption. These void-containing aggregates enable a coating to retain a significant capacity for liquid absorption even when the aggregate particles are densely packed, which minimizes the inter-particle void volume of the coating.

The size of the alumina particles of which the coating is comprised impacts the glossiness of the coating. It should be noted that when the alumina particles used in the present invention comprise aggregates of fused (i.e., aggregated) primary particles, the diameter values refer to the diameters of the aggregates. Particle diameter can be determined by any suitable technique, for example, by a light scattering technique, (e.g., using a Brookhaven 90Plus Particle Scanner, available from Brookhaven Instruments Corporation, Holtsville, N.Y.).

In order to maximize glossiness, it is preferred that the mean diameter of the alumina particles (i.e., the aggregates) is less than about 1 μm. More preferably, the mean diameter of the alumina particles is less than about 500 nm, still more preferably the mean diameter of the alumina particles is less than about 400 nm, and most preferably the mean diameter of the alumina particles is less than about 300 nm.

It is highly preferred that at least about 80% (e.g., at least about 90%) or substantially all of the alumina particles have diameters smaller than the mean diameter values set forth above. In other words, it is highly preferred that at least about 80% (e.g., at least about 90%) or substantially all of the particles have diameters of less than about 1 μm, more highly preferred that at least about 80% (e.g., at least about 90%) or substantially all of the particles have diameters of less than about 500 nm, still more highly preferred that at least about 80% (e.g., at least about 90%) or substantially all of the particles have diameters of less than about 400 nm, and most highly preferred that at least about 80% (e.g., at least about 90%) or substantially all of the particles have diameters of less than about 300 nm.

In certain preferred embodiments, the mean diameter of the alumina particles is at least about 40 nm (e.g., particles having a mean diameter from about 40 nm to about 300 nm, preferably from about 80 nm to about 300 nm, more preferably from about 100 nm to about 200 nm, still more preferably from about 120 nm to about 190 nm, and most preferably from about 140–180 nm (e.g., from about 150–170 nm)). In certain of these embodiments, at least about 80% (e.g., at least about 90%) or substantially all of the alumina particles have diameters of at least about 100 nm (e.g., from about 100 nm to about 200 nm, more preferably from about 120 nm to about 190 nm, and most preferably from about 140–180 nm (e.g., from about 150–170 nm)).

In other embodiments of the present invention, the alumina particles preferably have a mean diameter of less than about 300 nm, more preferably less than about 200 nm, still more preferably less than about 190 nm, and most preferably less than about 180. In certain embodiments it is preferred that at least about 80% (e.g., at least about 90%) or substantially all of the alumina particles have diameters of less than about 300 nm, more preferably less than about 200 nm, still more preferably less than about 190 nm, and most preferably less than about 180 nm.

The coating can comprise alumina particles having any suitable range of individual particle diameters, such as a relatively broad range or a relatively narrow range. The particles also can be monodispersed. By monodispersed is meant that the individual particles have diameters that are substantially identical. For example, substantially all mono-dispersed 150 nm particles have diameters in the range of from about 140 nm to about 160 nm.

With respect to the primary particles that make up these alumina aggregates, in certain embodiments of the present invention, such as when a glossy coating having a relatively high rate of and capacity for liquid absorption is desired, it is preferred that the primary particles have a mean diameter of less than about 100 nm (e.g., from about 1 nm to about 100 nm). More preferably, the primary particles have a mean diameter of less than about 80 nm (e.g., from about 1 nm to about 80 nm), even more preferably less than about 50 nm (e.g., from about 1 nm to about 50 nm), and most preferably less than about 40 nm (e.g., from about 5 nm to about 40 nm).

In certain of these embodiments it is preferred that at least about 80% (e.g., at least about 90%) or substantially all of the primary particles have diameters smaller than the mean diameter values set forth above. In other words, it is preferred that at least about 80% (e.g., at least about 90%) or substantially all of the primary particles have diameters of less than about 100 nm (e.g., from about 1 nm to about 100 nm), more preferred that at least about 80% (e.g., at least about 90%) or substantially all of the primary particles have diameters of less than about 80 nm (e.g., from about 1 nm to about 80 nm), even more preferred that at least about 80% (e.g., at least about 90%) or substantially all of the primary particles have diameters of less than about 50 nm (e.g., from about 1 nm to about 50 nm), and most preferred that at least about 80% (e.g., at least about 90%) or substantially all of the primary particles have diameters of less than about 40 nm (e.g., from about 5 nm to about 40 nm).

It will be appreciated that the surface area of the alumina particles of the recording medium of the present invention is largely a function of the mean diameter of the primary particles, rather than the mean diameter of the aggregates. The alumina particles of the recording medium of the present invention can have any suitable surface area. While the alumina particles of the recording medium of the present invention can have a surface area of up to about 400 $m^2/g$ (e.g., about 20–400 $m^2/g$), it is preferred that the surface area of the alumina particles of the recording medium of the present invention have a surface area of less than about 200 $m^2/g$, more preferably less than about 150 $m^2/g$. In a particularly preferred embodiment, the alumina particles of the recording medium of the present invention have a surface area of less than about 400 $m^2g/$ (e.g., about 15–300 $m^2/g$, more preferably about 20–200 $m^2/g$, more preferably about 30–80 $m^2/g$, and most preferably about 40–60 $m^2/g$).

The glossiness of the recording medium of the present invention can be measured using any suitable technique. For example, the glossiness of the present invention can be measured in terms of the 75° specular gloss, according to JIS P 8142, or an equivalent U.S. standard, using a gloss photometer, for example, a VGS-1001, manufactured by Nihon Denshoku Kogyosha, a Hunter 75° Gloss Meter, a Technidyne Glossmeter (e.g., Model T480A), or the like. Other suitable test methods can be used to determine glossiness, for example, ASTM, TAPPI, or the like. When TAPPI is used, it is preferably TAPPI T480. When ASTM is used, it is preferably ASTM D1223.

It is preferred that the recording medium of the present invention has a 75° specular gloss of at least about 15%. More preferably, the recording medium of the present invention has a glossiness of at least about 25%, even more preferably at least about 35%, still more preferably at least about 45%. In some instances, the glossiness is least about 55%, and even at least about 65%.

Desirably, the recording medium of the present invention is calendered to provide a glossier coating. The recording medium epreferably has a 75° specular gloss of at least about 15%, more preferably at least about 25%, even more preferably at least about 35%, and still more preferably at least about 45%. In a preferred embodiment, the recording medium of the present invention, when calendered, has a 75° specular gloss of at least about 50%. In some instances, depending on the substrate, the coating composition, the nature of the coating composition, and the method of applying the coating to the substrate, the recording medium of the present invention, when calendered, can have a glossiness of at least about 55%, and even at least about 65%.

The coating of the recording medium of the present invention has good dye immobilization properties and waterfastness. Organic dyes, such as those used in ink-jets inks, often contain ionizable functional groups (e.g., $SO_3H$, COOH, $PO_3H_2$, etc.), which increase the water solubility of the dyes. The dyes become negatively charged when these functional groups ionize in water (e.g., to $SO_3^-$, $COO^-$, $PO_3^{2-}$, etc.). As the alumina used in the glossy coating of the recording medium of the present invention has a cationic surface, the alumina particles enhances the ability of the coating to immobilize (i.e., adsorb) and display dye molecules at the surface of the coating. This is due to the strong electrostatic attraction of the dye toward the alumina particles in the glossy coating of the recording medium of the present invention.

Therefore, even though the ink can be rapidly absorbed into the coating via the pores of the alumina particles, the anionic dye molecules can be separated from the ink, and immobilized at the coating surface. As such, the coating of the recording medium of the present invention has excellent dye immobilizing ability, which promotes desirable qualities, for example, superior image quality and high optical density.

It is desirable for the alumina particles in the coating of the recording medium of the present invention to have a high positive zeta potential. The net charge on the alumina particles of the recording medium of the present invention can be qualitatively determined by measuring the zeta potential of the dispersion (e.g., using a Matec MBS 8000 or a Brookhaven Zeta Plus instrument). A negative zeta potential is indicative of a net negative charge, while a positive zeta potential indicates a net positive charge. The magnitude of the zeto potential is proportional to the magnitude of the charge.

Dye adhesion to the surface of a recording medium can be quantified by measuring the optical density and waterfastness of a test sample of the recording medium to which an aqueous ink-jet ink comprising and anionic dye has been applied. For example, a test sample having an ink coverage of about 12 $g/m^2$ over an area of about 90 $cm^2$ can be cut in half and tested in the following manner. One minute after applying the ink, one of the halves is soaked in deionized water for one minute and then repeatedly dipped in and out of the water to remove all dissolved ink from the sample. After drying, a densitometer (e.g., a MacBeth 512 densitometer) can be used to measure the image intensity at a number of positions (e.g., at ten random positions) on each half of the test sample, and the values for each half averaged. The optical density of the recording medium is the average image intensity of the half of the test sample that was not soaked in water. The waterfastness can be reported as:

$$1-\left[\frac{(\text{ave. I.I. of unsoaked})-(\text{ave. I.I. of soaked})}{(\text{ave. I.I. of unsoaked})}\right]$$

wherein ave. I.I. is the average image intensity of each half of the test sample (i.e., the half that was soaked in water and the half that was not soaked in water). Waterfastness values that are less than one, when calculated in this fashion, generally indicate loss of ink from the coating.

Alternatively, waterfastness can be evaluated in terms of retained optical density. For example, a test print can be evaluated by immersing a sample in deionized water for 5 minutes with light agitation, drying the sample, and comparing the color density of the dry soaked sample with that of an unsoaked sample (as indicated above) by measuring color density with a suitable densitomer (e.g., X-Rite® 938 Spectrodensitometer). Waterfastness can then be expressed in terms of the percentage of optical density retained by the soaked sample relative to the unsoaked sample.

The recording medium of the present invention exhibits excellent waterfastness. For example, the recording medium of the present invention typically retains at least about 50% of the optical density after immersion in deionized water for 5 minutes with light agitation. Preferably, after it is immersed in deionized water for 5 minutes with light agitation, the recording medium of the present invention retains at least about 60% of the optical density of the printed image, more preferably at least about 70% of the optical density, still more preferably at least about 80% of the optical density, and most preferably at least about 90% of the optical density is retained (e.g., about 95% or even 100% of the optical density).

The recording medium of the present invention also has a good rate of liquid absorption and good capacity for liquid absorption. The rate of liquid absorption can be measured by any suitable method, for example, by applying a droplet of a liquid (e.g., distilled water) to the coating surface and measuring the change in the angle of the droplet with respect to the surface (contact angle) over time. Preferably, the contact angle of distilled water, when applied to the glossy coating of the recording medium of the present invention, decreases by at least about 5° over the first five minutes. More preferably, the contact angle decreases by at least about 7° over the first five minutes. Most preferably, the contact angle of distilled water, when applied to the glossy coating of the recording medium of the present invention, decreases by at least about 10° over the first five minutes.

The capacity for liquid absorption of the coating of the recording medium of the present invention can be measured by any suitable technique. For example, the capacity for liquid absorption can be measured by contacting a liquid, for example, water, or a 1:1 solution of polyethylene glycol (e.g., PEG 400) and water, or the like, with a predetermined area of the glossy coating of the recording medium of the present invention for 10 seconds at 22° C., followed by contacting the medium with a blotting paper to remove excess solution, measuring the weight of the solution absorbed by the glossy coating, and expressing that weight in terms of $g/m^2$.

Alternatively, the liquid absorption capacity of the coating can be measured as a function of porosity. Porosity can be measured by any suitable method, for example, by measuring the total intrusions volume of a liquid (e.g., mercury) into the glossy coating applied to a non-porous substrate (e.g., polyethylene). It will be appreciated that the total intrusion volume of a liquid for a particular coating (and, therefore, the porosity) can be a function of variables that influence the structure of the coating, for example, binder type, pigment-to-binder ratio, pigment particle size, calendering, and the like. Preferably, the porosity is determined by measuring the total intrusion volume of mercury. In this regard, the glossy coating of the recording medium of the present invention, when the substrate is a non-porous substrate, preferably has a total mercury intrusion volume of at least about 0.3 ml/g, more preferably at least about 0.5 ml/g, still more preferably at least about 0.8 ml/g, most preferably about 1 ml/g or greater.

The properties of the inventive recording medium promote high image quality when used in the vast majority of printing applications. Any suitable printing method can be used to apply an image to the inventive recording medium. Such printing methods include, but are not limited to gravure, letterpress, collotype, lithography (e.g., offset lithography), ink-jet, and printing with hand-held implements (e.g., pens), with ink-jet printing being preferred.

Any suitable binder can be used in the coating of the recording medium of the present invention. Preferred binders include, but are not limited to, polyvinyl alcohol (PVOH), polyvinyl acetate, polyvinyl acetal, polyvinyl pyrrolidone, oxidized starch, etherified starch, cellulose derivatives (e.g., carboxymethyl cellulose (CMC), hydroxyethyl cellulose, etc.), casein, gelatin, soybean protein, silyl-modified polyvinyl alcohol, conjugated diene copolymer latexes (e.g., maleic anhydride resin, styrene-butadiene copolymer, methyl methacrylate-butadine copolymers, etc.), acrylic polymer latextes (e.g., polymers and copolymers of acrylic esters and methacrylate esters, polymers and copolymers of acrylic acid and methacrylic acid, etc.), vinyl polymer latexes (e.g., ethylene-vinyl acetate copolymer), functional group-modified polymer latexes obtained by modifying the above-mentioned various polymer with monomers containing functional groups (e.g., carboxyl groups), aqueous binders such as thermosetting resins (e.g., melamine resin, urea resin, etc.), synthetic resin binders such as polymethyl methacrylate, polyurethane resin, polyester resin (e.g., unsaturated polyester resin), amide resin, vinyl chloride-vinyl acetate copolymer, polyvinyl butyral, and alkyd resin, with polyvinyl alcohol being most preferred.

The alumina particles in the coating of the recording medium of the present invention have a low binder demand. As such, a higher pigment to binder ratio can be utilized in the coating of the recording medium of the present invention. The high pigment to binder ratio is advantageous in that a greater number of alumina particles per unit volume can exist in the coating of the recording medium of the present invention, improving the properties thereof (e.g., gloss and porosity). Preferably, the pigment to binder ratio of the coating of the recording medium of the present invention is at least about 2:1 by weight. More preferably the pigment to binder ratio of the coating of the recording medium of the present invention is at least about 5:1 by weight, still more preferably at least about 7:1 by weight, and most preferably at least about 8:1 weight. In some embodiments, the pigment to binder ration of the coating of the recording medium of the present invention is at least about 9:1 by weight (e.g., at least about 10:1 by weight).

The total amount of binder (i.e., dry binder) can be any suitable amount, but is preferably from about 1% to about 50% of the composition (i.e., dry binder and particles combined) by weight. More preferably, the total amount of binder is from about 1% to about 40% of the composition by weight, even more preferably from about 1% to about 30% by weight, still more preferably from about 3% to about 25% by weight, yet more preferably from about 5% to about 15% by weight, and most preferably from about 5% to about 10% by weight (e.g., about 9% by weight).

When PVOH is used as a binder, the total amount of PVOH is preferably from about 1% to about 50% of the composition by weight, more preferably from about 1% to about 40% by weight, even more preferably from about 1% to 30% by weight, yet more preferably from about 3% to about 25% by weight, still more preferably from about 5% to about 15% by weight, and most preferably from about 5% to about 10% by weight, (e.g., about 9% by weight).

In certain embodiments of the present invention, the glossy coating of the inventive recording medium comprises one or more pigments in addition to alumina particles, such as calcium carbonate, clays, aluminum silicates, urea-formaldehyde filters, and the like. Other suitable pigments include silica (e.g., colloidal silica, precipitated silica, silica gel, pyrogenic silica, or cationically modified analogs thereof), alumina (e.g., alumina sols, colloidal alumina, cationic aluminum oxide or hydrates thereof, pseudoboehmite, boehmite, $Al(OH)_3$, etc.), magnesium silicate, magnesium carbonate, kaolin, talc, calcium sulfate, barium sulfate, titanium dioxide, zinc oxide, zinc sulfide, zinc carbonate, satin white, diatomaceous earth, calcium silicate, aluminate hydroxide, lithopone, zeolite, hydrated halloycite, magnesium hydroxide, polyolefins (e.g., polystyrene, polyethylene, polypropylene, etc.), plastics (e.g., acrylic), urea resin, and melamine resin.

The glossy coating of the recording medium of the present invention also can comprise one or more other additives, such as surfactants (e.g., cationic surfactants, such as surfactants (e.g., cationic surfactants, anionic surfactants such as long-chain alkylbenzene sulfonate salts and long-chain, preferably branched chain, alkylsulfosuccinate esters, nonionic surfactants such as polyalkylene oxide ethers of long-chain, preferably branched-chain alkyl group-containing phenols and polyalkylene oxide ethers of long-chain alkyl alcohols, and fluorinated surfactants), silane coupling agents (e.g., γ-aminopropyltriethoxysilane, N-β (aminoethyl) γ-aminopropyltrimethoxysilane, etc.), hardeners (e.g., active halogen compounds, vinylsulfone compounds, aziridine compounds, epoxy compounds, acryloyl compounds isocyanate compounds, etc.), pigment dispersants, thickeners (e.g., carboxymethyl cellulose (CMC)), flowability improvers, antifoamers (e.g., octyl alcohol, silicone-based antifoamers, etc.), foam inhibitors, releasing agents, foaming agents, pentetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antifungal agents, yellowing inhibitors (e.g., sodium hydroxymethanesulfonate, sodium p-toluenesulfinate etc.), ultraviolet absorbers (e.g., benzotriazole compounds having a hydroxy-dialkylphenyl group at the 2-position), antioxidants (e.g., sterically hindered phenol compounds), antistatic agents, pH regulators (e.g., sodium hydroxide, sodium carbonate, sulfuric acid, hydrochloric acid, phosphoric acid, citric acid, etc.), water-resisting agents, wet strengthening agents, and dry strengthening agents.

The present invention further provides a coating composition comprising alumina particles and a binder, wherein the alumina particles are aggregates of primary particles and the solids content of the alumina in the coating composition greater than about 10 wt. %.

Any suitable alumina particles can be used in the coating composition of the present invention. Suitable alumina particles include the alumina particles described herein with respect to the coating of the recording medium of the present invention. The alumina particles used in the coating composition of the present invention can be of any suitable diameter and surface area. Suitable particle diameters and surface areas of the particles include the particle diameters and surface areas described herein with respect to the coating of the recording medium of the present invention.

Any suitable binder can be used in coating composition of the present invention, including those described herein with respect to the coating of the recording medium of the present invention. Likewise, any suitable pigment to binder ratio can be used in the coating composition of the present invention. Preferably, the pigment to binder ratio is at least about 2:1 by weight. More preferably the pigment to binder ratio of the coating composition of the present invention is at least about 5:1 by weight, still more preferably at least about 7:1 by weight, and most preferably at least about 8:1 by weight. In some embodiments, the pigment to binder ration of the coating composition of the present invention is at least about 9:1 by weight (e.g., at least about 10:1 by weight).

The coating composition of the present invention typically includes a suitable carrier. The carrier can be any suitable fluid or combination of fluids (e.g., solvents) in which the first and second groups of particles, and any other additives (e.g., one or more binders), can be missed and applied to a substrate. Preferred carriers have a relatively high vapor pressure to accelerate drying of the coating after application, and preferred examples include, but are not limited to, organic solvents (e.g., methanol) and water, with water being most preferred.

In certain embodiments, coating composition of the present invention comprises one or more pigments in addition to alumina particles, including those described herein with respect to the coating of the recording medium of the present invention. The coating composition of the present invention also can comprise one or more other additives, for example, surfactants, silane coupling agents, hardeners, pigment dispersants, thickeners, flowability improvers, antifoamers, foam inhibitors, releasing agents, foaming agents, pentetrants, coloring dyes, coloring pigments, whiteners, antifungal agents, yellowing inhibitors, ultraviolet absorbers, antioxidants, water-resisting agents, wet strengthening agents, and dry strengthening agents, including those described herein with respect to the coating of the recording medium of the present invention.

The present invention further provides a method of preparing a coating composition. The method comprises:

providing a colloidally stable dispersion comprising water and alumina particles, wherein the alumina particles are aggregates of primary particles and the solids content of the alumina particles in the dispersion is at greater than about 20 wt. %;

adding a binder to and, optionally, diluting the colloidally stable dispersion, until a desired pigment to binder ratio and overall solids content are obtained; and optionally adjusting the pH with a suitable acid or base.

Any suitable alumina particles can be used in the inventive method of preparing a coating composition. Suitable alumina particles include the alumina particles described herein with respect to the coating of the recording medium of the present invention. The alumina particles used in the inventive method of preparing a coating composition can be of any suitable diameter and surface area. Suitable particle diameters and surface areas of the particles include the particle diameters and surface areas described herein with respect to the coating of the recording medium of the present invention.

Any suitable binder can be used in the inventive method of preparing a coating composition, including those described herein with respect to the coating of the recording medium of the present invention. Likewise, any suitable pigment to binder ratio can be used in preparing the coating composition in accordance with the method of the present invention. Preferred pigment to binder ratios include those described herein with respect to the coating of the recording medium of the present invention.

A suitable carrier can be employed in the method of preparing a coating composition of the present invention. The carrier can be present in the dispersion or can be added to the dispersion to produce the final coating composition. Suitable carriers include those described herein with respect to the coating of the recording medium of the present invention, with water being most preferred.

In accordance with the inventive method of preparing a coating composition, one or more pigments can be added to the dispersion in addition to the alumina particles, including those described herein with respect to the coating of the recording medium of the present invention. One or more other additives also can be added, including those described herein with respect to the coating of the recording medium of the present invention.

The colloidally stable dispersion (i.e., the initial dispersion) used to prepare the coating composition in accordance with the present invention has a high solids content (i.e., greater than about 20 wt. % alumina solids) and also is colloidally stable. The high alumina solids content of the initial dispersion is highly advantageous in that a higher solids content of the coating composition can be achieved (e.g., at least about 20 wt. % total solids taking the binder and other additives into account). As a result, drying time in coating operations is significantly diminished, making the overall process less costly and more efficient. The initial dispersion can be prepared by any suitable method, but is preferably prepared according to the method described in U.S. Pat. No. 5,527,423.

Preferably, the alumina solids content of the initial dispersion is at least about 25 wt. %, more preferably at least about 30 wt. %, still more preferably at least about 35 wt. %, even more preferably at least about 40 wt. %, and most preferably al least about 50 wt. %. In certain embodiments, the alumina solids content of the colloidally stable dispersion is about 25–50 wt. % or 30–50 wt. %, but is more preferably about 30–50 wt. %, most preferably about 40–50 wt. %.

The alumina particles in the initial dispersion used in the method of the present invention can have any suitable positive zeta potential. Desirably, the positive zeta potential is sufficiently high to promote colloidal stability in the initial dispersion. Preferably, the zeta potential of the alumina particles in the initial dispersion is at least about +20 mV. More preferably, the zeta potential of the alumina particles in the initial dispersion dispersion is at least about +30 mV. Most preferably, the zeta potential of the alumina particles in the initial dispersion is at least about +40 mV.

The initial dispersion can be of any suitable pH. Preferably, the pH of the initial dispersion is about 3–5, and more preferably is about 3.5–4.5, but most preferably is about 4–4.5. While the initial dispersion can have a range of specific gravity values, the specific gravity of the initial dispersion preferably is in the range of about 1–2 kg/l.

The initial dispersion used to prepare the coating composition of the present invention has excellent rheological properties, making the dispersion and coating compositions derived therefrom highly amenable to large scale coating operations. For example, the initial dispersion exhibits low viscosity at a high shear rate, e.g., as measured in a Hercules® High-Shear Viscometer at 4400 RPM, FF Bob measuring geometry. Preferably, the initial dispersion, at an alumina solids content of about 40 wt. %, has an apparent viscosity of less than about 20 cp at high shear rate (e.g., as measured in a Hercules® High-Shear Viscometer at 4400 RPM, FF Bob measuring geometry). More preferably, the initial dispersion (at about 40 wt. % alumina solids) has an apparent viscosity of less than about 15 cp, as measured in a Hercules® High-Shear Viscometer at 4400 RPM, FF Bob measuring geometry. Most preferably, the initial dispersion (at about 40 wt. % alumina solids) has an apparent viscosity of less than about 10 cp, as measured in a Hercules® High-Shear Viscometer at 4400 RPM, FF Bob measuring geometry.

The initial dispersion used to prepare the coating composition of the present invention also exhibits low viscosity at a low shear rate, e.g., as measured in a Brookfield Model RV viscometer, spindle #1, after about 30 seconds at 60 RPM. Preferably, the initial dispersion (at about 40 wt. % alumina solids) has an apparent viscosity of less than about 100 cp at low shear rate (e.g., as measured in a Brookfield Model RV viscometer, spindle #1, after about 30 seconds at 60 RMP). More preferably, the initial dispersion (at about 40 wt. % alumina solids) has an apparent viscosity of less than about 80 cp, as measured in a Brookfield Model RV viscometer, spindle #1, after about 30 seconds at 60 RPM. Most preferably, the initial dispersion (at about 40 wt. % alumina solids) has an apparent viscosity of less than about 50 cp, as measured in a Brookfield Model RV viscometer, spindle #1, after about 30 seconds at 60 RPM.

The initial dispersion used to prepare the coating composition of the present invention can be very high in alumina solids content (e.g., 30–50 wt. % alumina solids), yet maintain long-term colloidal stability (e.g., 1 year). Coating compositions prepared from the initial dispersion in accordance with the method of the present invention have a significantly lower binder demand and have greater runnability than conventional alumina coating compositions. Moreover, when applied to a substrate as a coating, the coating composition prepared from the initial dispersion in accordance with the present invention require significantly less drying time than conventional coatings. The coatings on the recording media thus produced have high porosity, excellent gloss, dye-immobilizing ability, and waterfastness, and provide superior image quality.

The present invention further provides a method of preparing a recording medium. The inventive method of preparing a recording medium comprises:

providing a substrate;

coating the substrate with the coating composition of the present invention to produce a substrate coated with a coating;

optionally calendering the coated substrate; and drying the coated substrate.

A indicated above, the coating composition of the present invention provides fast drying times, drying quickly to form a non-tacky glossy coating. The coating composition can be applied using any suitable method or combination of methods. Suitable methods include, but are not limited to, roll coating, blade coating, air knife coating, rod coating, bar coating, cast coating, gate roll coating, wire bar coating, short-dowel coating, slide hopper coating, curtain coating, flexographic coating, gravure coating, Komma coating, size press coating in the manner of on- or off-machine, and die coating, with rapid, inexpensive methods such as rod coating and air knife coating being preferred.

The coated substrate can be dried using any suitable method. Suitable drying methods include, but are not limited to, air or convection drying (e.g., linear tunnel drying, arch drying, air-loop drying, sine curve air float drying, etc.), contact or conduction drying, and radiant-energy drying (e.g., infrared drying and microwave drying).

Many physical properties of a glossy coating prepared with the coating composition of the present invention, can be rationally optimized by varying the relative quantity of particles from each group contained therein. It will be appreciated that materials other than the alumina particles (e.g., binders, thickeners, and the like) can be varied to alter or optimize the physical properties of the coating composition of the present invention.

The primary features of the inventive method of preparing a recording medium are as previously described with respect to the recording medium and coating composition of the present invention. For example, the preferred substrates, coating methods, coating composition (e.g., solids content, binder content, apparent density, additives, etc.), properties of the alumina particles (i.e., materials, diameters, surface area, etc.), coating properties (i.e., thickness, number and constitution of coating layers, glossiness, rate and capacity of liquid absorption, packing density, adhesiveness, etc.), are as described herein with respect to the recording medium and coating composition of the present invention.

The following examples further illustrate the present invention but, of course, should not be construed as in any way limiting its scope.

EXAMPLE 1

This example illustrates the preparation of a coating composition of the present invention. An initial dispersion of fumed alumina was prepared in accordance with U.S. Pat. No. 5,527,423. The fumed alumina had a surface area of about 55 $m^2/g$. The fumed alumina was greater than 95% crystalline, of which about 70% was theta phase, about 20% was delta phase, and about 10% was gamma phase, the fraction of alpha phase having been below the detection limit.

The dispersion had an alumina solids content of 40.0 wt. %, a pH of 4–4.4, and a specific gravity of 1.4 kg/l. The viscosity of the final dispersion was less than 50 cp when measured using a Brookfield Model LV viscometer, spindle #1, after 60 seconds at 60 RPM. The mean diameter of the alumina particles in the final dispersion was 154 nm as measured in a Brookhaven 90Plus Particle Scanner (Brookhaven Instruments Corporation, Holtsville, N.Y.). An electron micrograph of the alumina particles in the initial dispersion is illustrated in FIG. 1.

Figure 2:
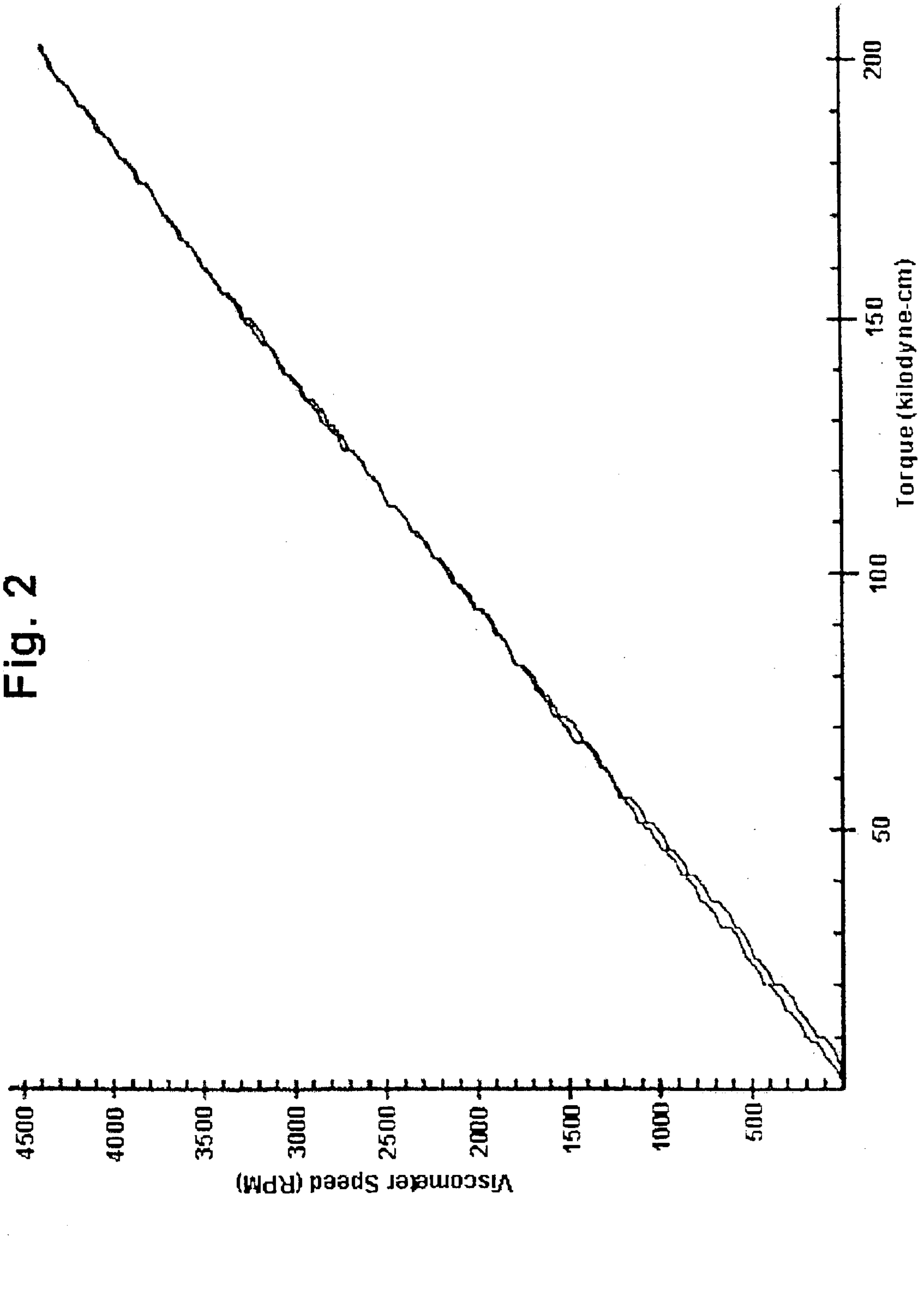
FIG. 2 illustrates a rheogram of an alumina dispersion useful in preparing the coating composition and recording medium of the present invention.

The initial dispersion had excellent rheological properties. The apparent viscosity of the initial dispersion, as measured in a Hercules® High-Shear Viscometer at 4400 RPM, FF Bob measuring geometry, was 8.8 cp (centipoise). The rheogram of the initial dispersion, as generated in a Hercules® High-Shear Viscometer from 0–4400 RPM, FF Bob measuring geometry, is illustrated in FIG. 2.

The zeta potential of the particles in the dispersion was +40 mV. The dispersion was colloidally stable in that there was no appreciable increase in viscosity or gellation after one year at a storage temperature ranging from 40–110° F. (4–43° C.).

Figure 3:
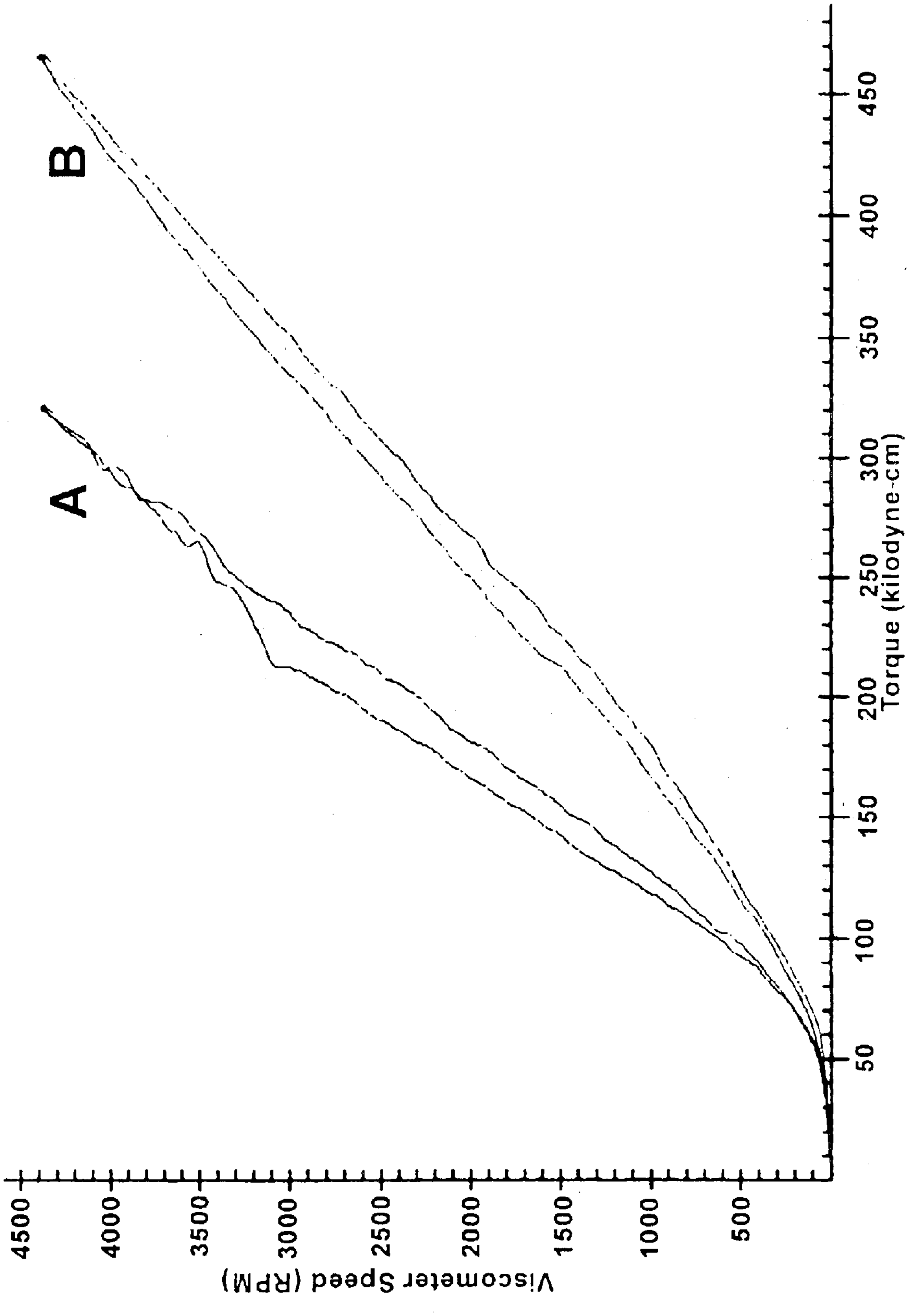
FIG. 3 illustrates two rheograms (A and B) of coating compositions useful in preparing the recording medium of the present invention.

A coating composition was prepared by adding sufficient polyvinyl alcohol binder (PVOH) to the initial dispersion to give a pigment to binder ratio of 7:1, HEC (1.55 wt. %), and diluting to an overall solids content (including binder) of 24.28 wt. %. The final pH was 4.20. The coating composition had excellent rheological properties. The viscosity of the composition was 888 cp when measured using a Brookfield Model RV viscometer, spindle #5, after 30 seconds at 100 RPM. The apparent viscosity of the composition was 24.1 cp as measured in a Hercules® High-Shear Viscometer at 4400 RPM, FF Bob measuring geometry. The rheogram of the coating composition, as generated in a Hercules® High-Shear Viscometer from 0–4400 RPM, FF Bob measuring geometry, is illustrated in FIG. 3 (curve B).

The coating composition produced excellent coatings with an unusually low pigment to binder ratio of 7:1. The coating composition prepared in this example had significantly lower binder demand than conventional alumina coating compositions, which typically use a 3:1 pigment to binder ratio.

EXAMPLE 2

This example illustrates a coating composition prepared from the initial dispersion prepared in Example 1. A coating composition was prepared by adding sufficient polyvinyl alcohol binder (PVOH) to the dispersion prepared in Example 1 to give a pigment to binder ratio of 7:1, and diluting to an overall solids content (including binder) of 22.27 wt. %. The pH was adjusted to about 7.97 with ammonium hydroxide.

The coating composition had excellent rheological properties. The viscosity of the composition was 2076 cp when measured using a Brookfield Model RV viscometer, spindle #5, after 30 seconds at 100 RPM. The apparent viscosity of the composition was 14.0 cp as measured in a Hercules® High-Shear Viscometer at 4400 RPM, FF Bob measuring geometry. The rheogram of the coating composition, as generated in a Hercules® High-Shear Viscometer from 0–4400 RPM, FF Bob measuring geometry, is illustrated in FIG. 3 (curve A).

The coating composition produced excellent coatings with low pigment to binder ratio of 7:1. The coating composition prepared in this example had a low binder demand.

EXAMPLE 3

This example illustrates the preparation of a recording medium of the present invention. An uncoated paper substrate base was coated with the coating composition of Example 1, except that the coating composition had a total solids content of 26.3 wt. %, no HEC added was added, the pH of the coating composition was 4.45, and the pigment to binder ratio was 4:1. Coating was performed on a CLC (Cylindrical Laboratory Coater) blade coating apparatus at high speed. The CLC simulates conditions that are characteristic of commercial manufacture. The performance of a particular coating composition in the CLC at high speed is indicative of how the coating composition is expected to perform under high speed commercial manufacturing conditions. The coating was preformed at a rate of 2000 feet per minute. (610 meters per minute) using a flexible blade, and the coating was dried (infrared). The coating dried quickly.

The dry coat weight in grams per square meter ($g/m^2$) for each recording medium (i.e., coated substrated) was determined, and the dry recording media (uncalendered) were analyzed. Optical and surface properties were measured for each recording medium and also for the uncoated substrate.

Samples were calendered on one side with 3 nips at 6 pli (pounds per linear inch) (1.25 kg/linear cm) and 60° C. The optical, surface and printing properties were measured for the calendered samples, and the results were compared to the uncalendered samples.

The uncoated paper substrate had the following properties: basis weight: 77.5 $g/m^2$; pH: 6.6; ash: 8.31%; caliper 3.62/1000" (91.9 $\mu$m); brightness: 82.7%; gloss; 6.4; smoothness: 3.93 $\mu$m; Hercules® sizing test: 109 sec; and PPS porosity: 2.77 ml/min. The recording media obtained by coating the substrate in accordance with this example had excellent gloss, brightness, and porosity. The coating had an excellent appearance and superior feel, and did not crack or exhibit brittleness. Moreover, the recording media produced an excellent printed image.

Brightness was measured using a Technidyne® Brightness Meter Tappi Procedure T 452 OM-92. Gloss was measured using a Hunter 75° degree gloss meter according to TAPPI standard procedure T 480OM-92. The surface smoothness and porosity of the sheets were measured using a Parker Print Surf (PPS) tester (TAPPI T555 PM-94). The rate of liquid absorption of the papers were measured using a First 10 Angstrom Dynamic Contact Angle measuring device.

The properties of the recording media (uncalendered and calendered) are shown below in Table 1.

TABLE 1

| Medium | Brightness (%) | 75° Specular Gloss (%) | PPS Smoothness (μm) | Porosity (ml/min.) |
|---|---|---|---|---|
| Uncoated Substrate | 82.7 | 6.4 | 3.93 | 2.77 |
| Coated Substrate (8 g/m$^2$) | 86.7 | 13.0 | 3.68 | 82.6 |
| Calendered (8 g/m$^2$) | 83.9 | 66.3 | 1.16 | 20.0 |

The samples were printed on Epson Stylus® Pro Photorealistic and Hewlett Packard® 820C ink jet printers using a test pattern created with ADOBE® software. The print gloss and print density of the samples was then measured. Print gloss was measured using a Gardener 60 degree Micro-Glass meter. Print density was measured using a BYK Gardner® densitometer. The properties of the image as printed using the Epson® Stylus Pro Photorealistic and the Hewlett Packard® 820C are shown in Tables 2A and 2B, respectively.

TABLE 2A

| | Epson Stylus ® Pro ES Wide Format | | | | | |
|---|---|---|---|---|---|---|
| Medium | Black | Cyan | Magenta | Yellow | Ink Gloss | Coating Gloss |
| Coated Substrate (8 g/m$^2$) | 1.44 | 0.69 | 0.91 | 0.79 | 1.82 | 13.0 |
| Calendered (8 g/m$^2$) | 1.64 | 0.73 | 1.02 | 0.98 | 14.8 | 66.3 |

TABLE 2B

| | Hewlett Packard ® 820C | | | | | |
|---|---|---|---|---|---|---|
| Medium | Black | Cyan | Magenta | Yellow | Ink Gloss | Coating Gloss |
| Coated Substrate (8 g/m$^2$) | 1.57 | 1.18 | 1.23 | 0.86 | 9.40 | 13.0 |
| Calendered (8 g/m$^2$) | 1.64 | 0.73 | 1.02 | 0.98 | 11.7 | 66.3 |

These results demonstrate that the recording media produced in accordance with this example exhibited excellent optical, physical, and textural properties, as indicated by the high measured values for gloss (low PPS smoothness), and the high measured values for gloss (low PPS smoothness), and the high measured values for brightness and porosity. These results also demonstrate the excellent quality of printed images attainable using such recording media, as indicated by the high values for ink density using several representative colors, as well as high ink gloss values.

EXAMPLE 4

Using the CLC apparatus described in Example 3, one side of a cellulose paper substrate was coated with the composition prepared according to Example 1, except that the total solids content of the coating composition was 26.4 wt. %, the pH was 4.5, the amount of HEC added was 3.0 wt. %, and the pigment to binder ratio was 5:1. Coating was performed at a rate of 3000 feet per minute (914 meters per minute) and the samples dried (infrared). The coatings were applied at three different coating weights, and the coatings dried quickly after they were applied to the substrate.

The dry coat weight in grams per square meter (g/m$^2$) for each recording medium was determined, and the dry recording media (uncalendered) were analyzed. Optical and surface properties were measured for each recording medium and also for the uncoated substrate. PPS (Parker Print Surf) roughness and brightness were measured. Brightness was measured in accordance with TAPPI brightness standard. Glossiness was measured in terms of the 75° specular gloss according to JIS P 8142 using a gloss photometer.

The recording media were calendered, and the 75° specular gloss measurements were determined for the calendered media. The results are shown in Table 3.

TABLE 3

| Coat Wt. (g/m$^2$) | Brightness (%) | 75° Specular Gloss (%) [Calendered] | PPS Smoothness (uncalendered) (μm) | PPS Porosity (uncalendered) (ml/min) |
|---|---|---|---|---|
| 5.67 | 92.6 | 26.1 [N/A] | 4.4 | 69.2 |
| 7.59 | 91.9 | 21.74 [69.6] | 4.2 | 70.6 |
| 10.85 | 92.2 | 24.92 [N/A] | 4.3 | 67.4 |

These data demonstrate that the coating composition of the present invention exhibits excellent performance at high speed and produces a glossy recording medium with excellent optical and surface properties under such conditions. These data demonstrate that the composition of the present invention possesses rheological properties desirable for producing high quality coatings under high speed manufacturing operations.

EXAMPLE 5

Using the CLC apparatus described in Example 3, one side of a cellulose paper substrate was coated with the composition prepared according to Example 1, except that the total solids content of the coating composition was 33.3 wt. %, the pH was 4.5, the amount of HEC added was 3.0 wt. %, and the pigment to binder ratio was 5:1. Coating was performed at a rate of 3000 feet per minute (914 meters per minute) and the samples dried (infrared). The coatings were applied at three different coating weights, and the coatings dried quickly after they were applied to the substrate.

The dry coat weight in grams per square meter (g/m$^2$) for each recording medium was determined, and the dry recording media (uncalendered) were analyzed. Optical and surface properties were measured for each recording medium and also for the uncoated substrate. PPS (Parker Print Surf) roughness and brightness were measured. Brightness was measured in accordance with TAPPI brightness standard. Glossiness was measured in terms of the 75° specular gloss according to JIS P 8142 using a gloss photometer.

The recording media was calendered, and the 75° specular gloss measurements were determined for the calendered media. The results are shown in Table 4.

TABLE 4

| Coat Wt. ($g/m^2$) | Brightness (%) | 75° Specular Gloss (%) [Calendered] | PPS Smoothness (uncalendered) ($\mu$m) | PPS Porosity (uncalendered) (ml/min) |
|---|---|---|---|---|
| 5.00 | 85.1 | 18.0 [N/A] | 4.2 | 17.1 |
| 14.4 | 86.9 | 20.6 [69.4] | 4.3 | 20.1 |
| 15.0 | 86.9 | 22.0 [N/A] | 4.3 | 18.3 |
| 18.0 | 85.1 | 19.80 [N/A] | 4.3 | 17.5 |

These data demonstrate that the coating composition of the present invention exhibits excellent performance at high speed and produces a glossy recording medium with excellent optical and surface properties under such conditions. These data demonstrate that the composition of the present invention possesses rheological properties desirable for producing high quality coatings under high speed manufacturing operations.

EXAMPLE 6

This example illustrates the rate of liquid absorption of the recording medium of the present invention. A coating composition was prepared in accordance with Example 1 (pigment to binder ratio 7:1), except that the coating composition had a total solids content of 29 wt. %, the pH of the composition was 4.5, and the amount of HEC added was 3.0 wt. %. Recording media were prepared by coating a cellulose paper substrate using the CLC coating apparatus as described in Example 4, except that the applied coating weights were 5.3 $g/m^2$, 8.0 $g/m^2$, and 13.6 $g/m^2$, respectively.

Figure 4:
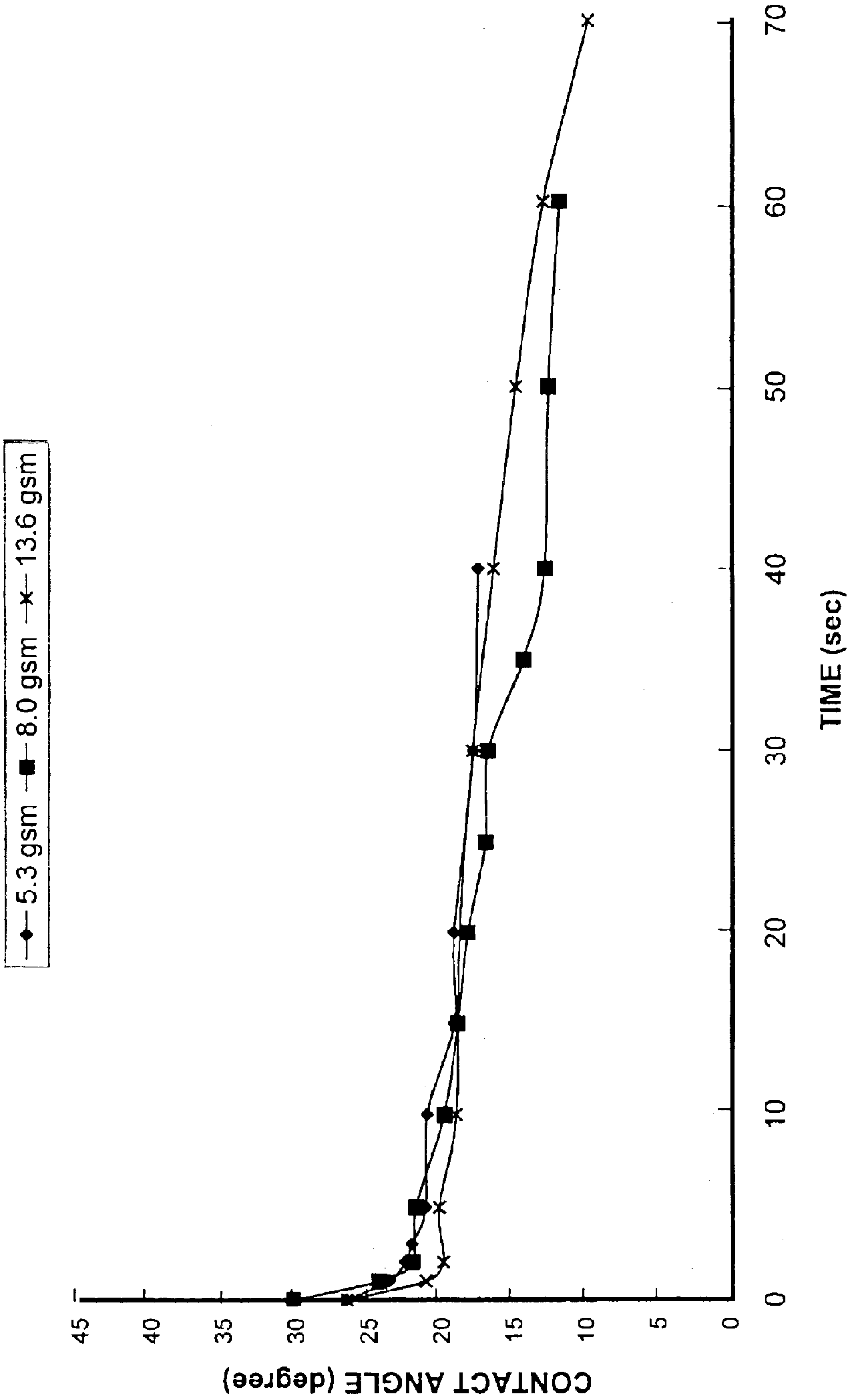
FIG. 4 illustrates the change in contact angle over time for a distilled water droplet applied to the recording medium of the present invention.

The change in contact angle (for a distilled water droplet) was measured over time for recording medium samples of each coating weight, and the results were plotted and are graphically depicted in FIG. 4.

As shown in FIG. 4, each sample exhibited a sharp initial decrease over the first few minutes, indicating a good rate liquid absorption for a range of coating weights.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. An ink-jet recording medium comprising a substrate having a glossy coating thereon, the glossy coating comprising furned alumina particles and a binder, wherein the fumed alumina particles have a surface area of about 30–80 $m^2/g$, and the glossy coating un calendered has a 75° specular gloss of about 15% or more and the glossy coating has a total mercury intrusion volume of about 0.3 ml/g or more.

2. The ink-jet recording medium of claim 1, wherein the substrate comprises a polymer or cellulose paper.

3. The ink-jet recording medium of claim 1, wherein the substrate comprises poly(ethylene terephthalate).

4. The ink-jet recording medium of claim 1, wherein the glossy coating has a 75° specular gloss of about 65% or more.

5. The ink-jet recording medium of claim 1, wherein the glossy coating has a total mercury intrusion volume of about 0.8 ml/g or more.

6. The ink-jet recording medium of claim 1, wherein the fumed alumina particles have a surface area of about 40–60 $m^2/g$.

7. The ink jet recording medium of claim 1, wherein the fumed alumina particles comprise aggregates of primary particles, and the aggregate have a mean diameter of about 1 $\mu$m or less.

8. The ink-jet recording medium of claim 7, wherein the fumed alumina particles comprise aggregates of primary particles, and the aggregates have a mean diameter of about 80–300 nm.

9. The ink-jet recording medium of claim 8, wherein the fumed alumina particles comprise aggregates of primary particles, and the aggregates have a mean diameter of about 100–200 nm.

10. The ink-jet recording medium of claim 7, wherein at least about 80% of the aggregates have a mean diameter of about 1 $\mu$m or less.

11. The ink-jet recording medium of claim 10, wherein at least about 90% of the aggregates have a mean diameter of about 1 $\mu$m or less.

12. The ink-jet recording medium of claim 1, wherein the alumina to binder ratio is about 2:1 by weight or more.

13. The ink-jet recording medium of claim 12, wherein the alumina to binder ratio is about 7:1 by weight or more.

14. The ink-jet recording medium of claim 13, wherein the alumina to binder ratio is about 9:1 by weight or more.

15. The ink-jet recording medium of claim 1, wherein the fumed alumina particles comprise aggregates of primary particles, and the primary particles have a mean diameter of about 1–100 nm.

16. The ink-jet recording medium of claim 15, wherein at least about 80% of the primary particles have a mean diameter of about 1–100 nm.

17. The ink-jet recording medium of claim 15, wherein the primary particles have a mean diameter of about 1–80 nm.

18. The ink-jet recording medium of claim 17, wherein at least about 80% of the primary particles have a mean diameter of about 1–80 nm.

19. The ink-jet recording medium of claim 17, wherein the primary particles have a mean diameter of about 1–50 nm.

20. The ink-jet recording medium of claim 19, wherein at least about 80% of the primary particles have a mean diameter of about 1–50 nm.

21. The ink-jet recording medium of claim 19, wherein the primary particles have a mean diameter of about 5–40 nm.

22. The ink-jet recording medium of claim 21, wherein at least about 80% of the primary particles have a mean diameter of about 5–40 nm.

* * * * *